Nov. 11, 1930. A. SCHMIDT 1,780,982
CELL FINISHING MACHINE
Filed March 17, 1928   3 Sheets-Sheet 2
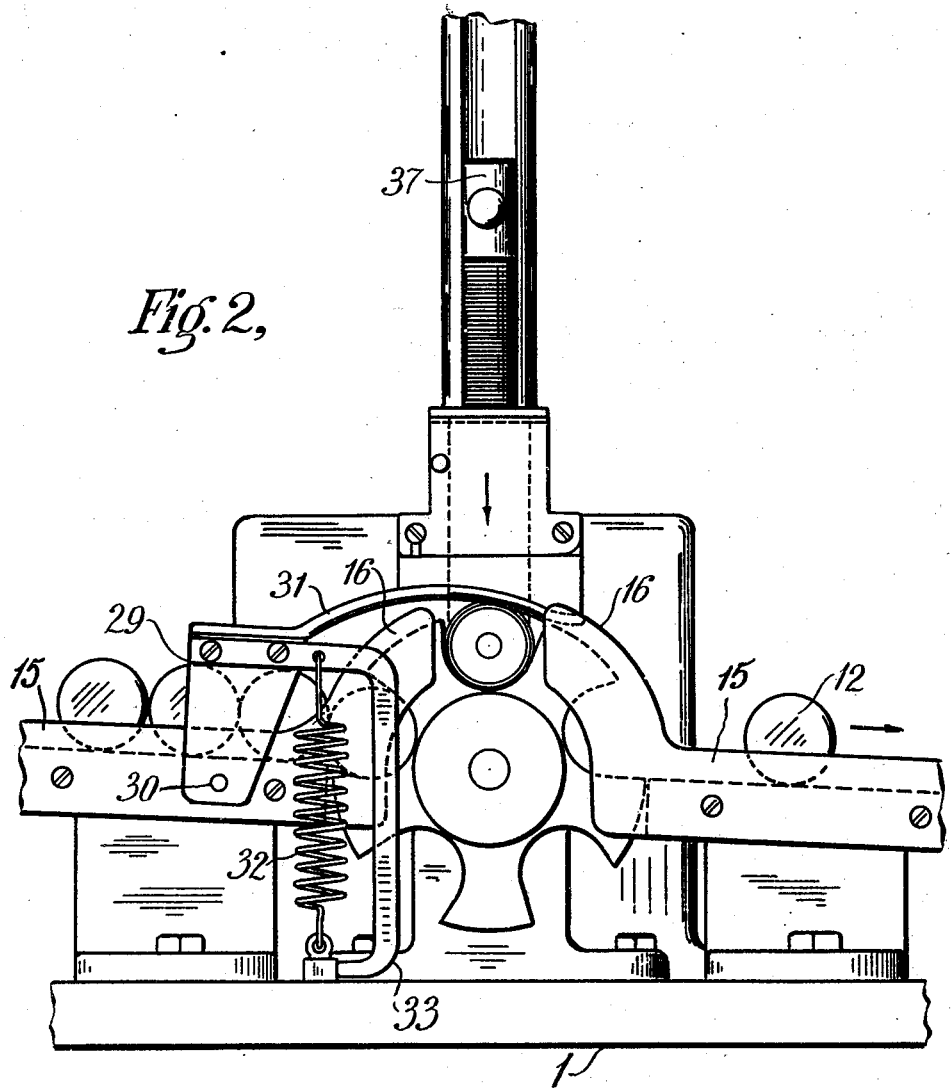
Fig. 2,
INVENTOR
Alfred Schmidt
BY
Meyers + Jones
ATTORNEY Nov. 11, 1930.  A. SCHMIDT  1,780,982
CELL FINISHING MACHINE
Filed March 17, 1928   3 Sheets-Sheet 3
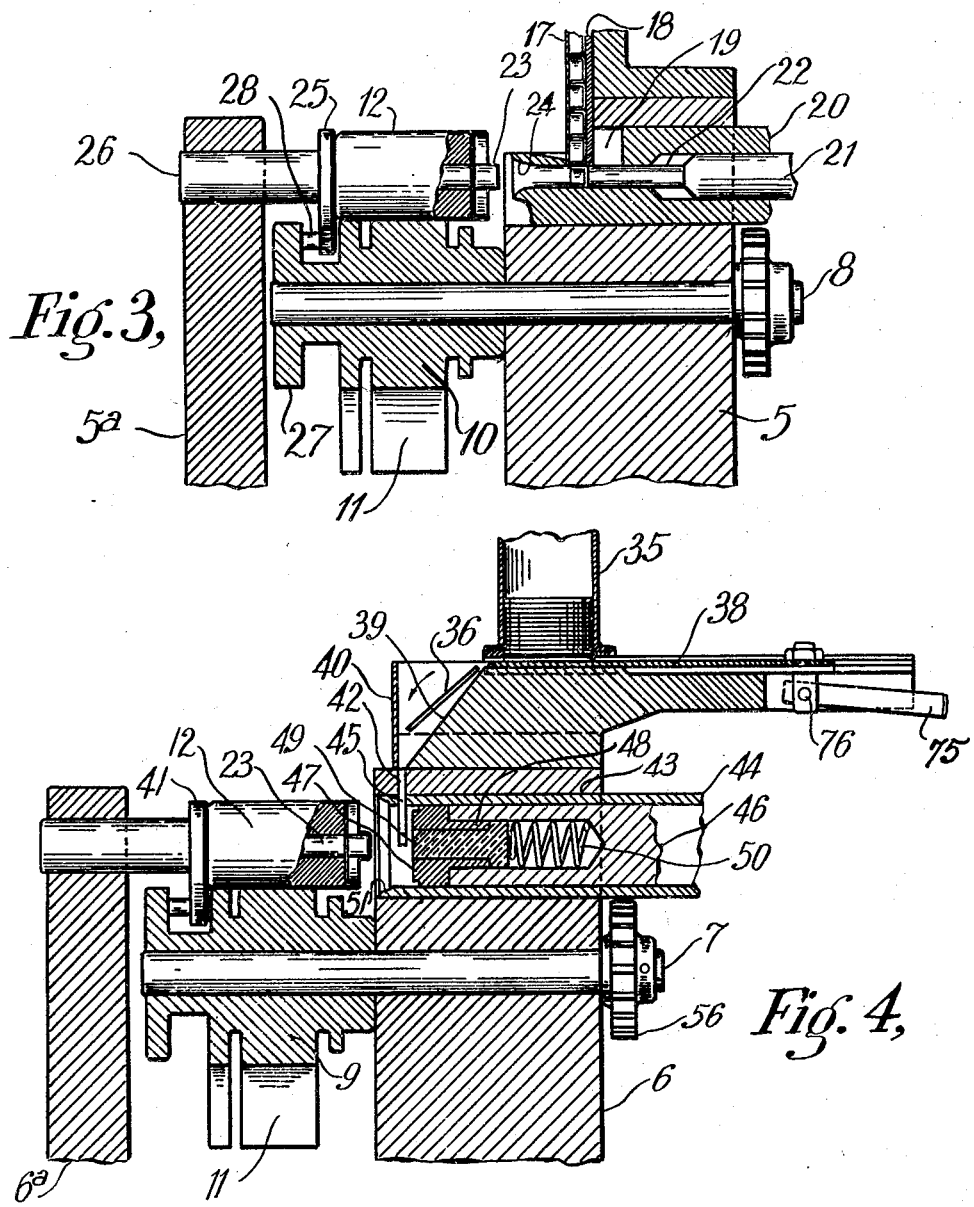
INVENTOR
Alfred Schmidt.
BY
Meyers & Jones
ATTORNEY Patented Nov. 11, 1930

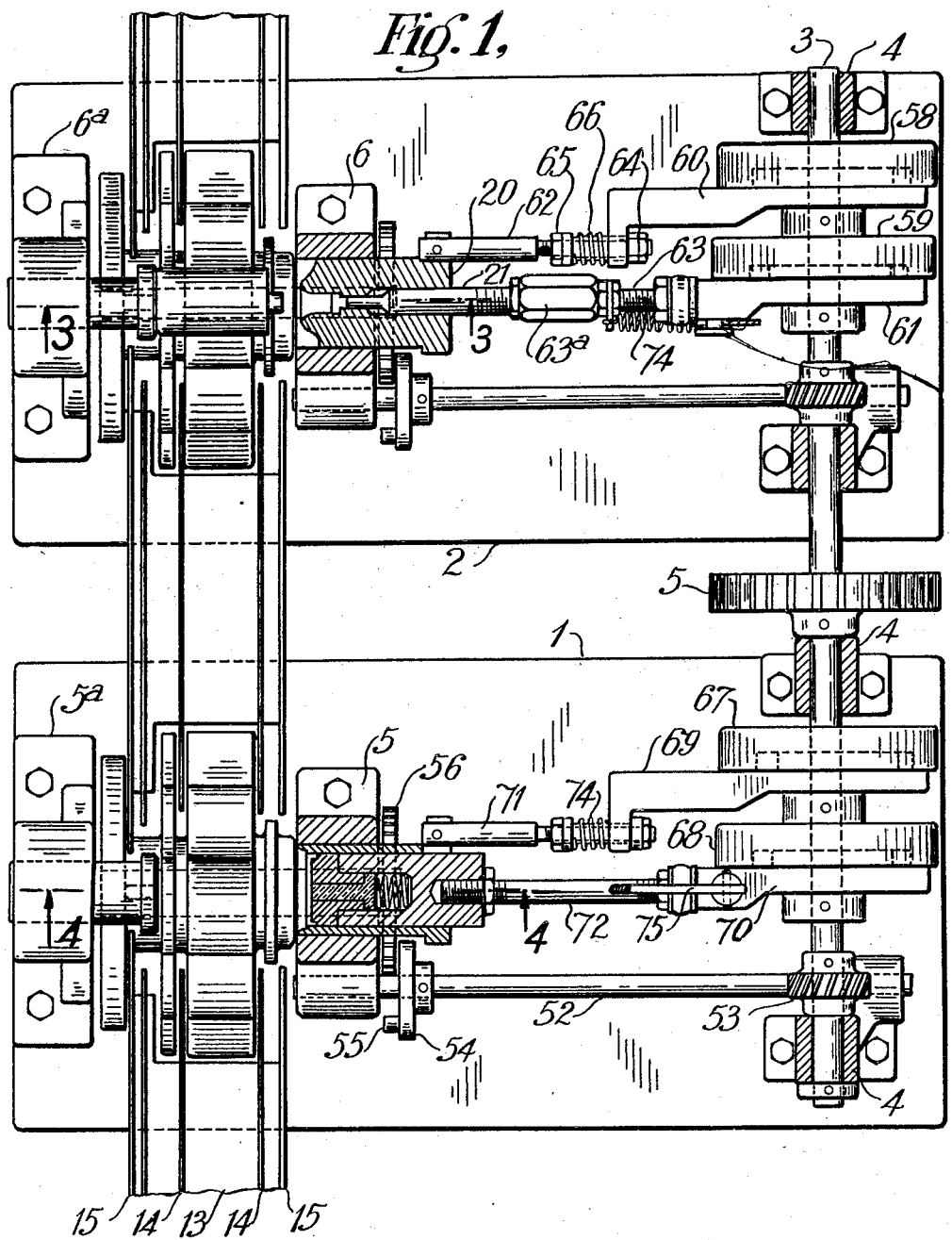

1,780,982

UNITED STATES PATENT OFFICE

ALFRED SCHMIDT, OF WEEHAWKEN, NEW JERSEY

CELL-FINISHING MACHINE

Application filed March 17, 1928. Serial No. 262,479.

This invention is an improvement in dry battery cell finishing machines, and particularly in machines for capping the carbons and inserting the washers in such cells.

In the usual form of dry cell, a zinc cup is provided, in which is inserted the depolarizing material. A carbon rod electrode is arranged at the axis of the cell, within this material, and the said rod projects slightly above the cup.

It is usual to cap the carbon electrode with a metallic cap, and to insert a washer of paper or the like, into the cell, the carbon electrode extending through the opening in the washer. The washer is inserted to a depth sufficient to provide for a seal, usually of sealing wax, above the washer.

One of the primary objects of the present invention is the provision of a machine of the character specified, by means of which the carbon rods may be capped, and the washers inserted in successive cells, moving by gravity on runways past the mechanisms for capping and washer inserting.

Another object is the provision in such a machine of means to support the individual cells at the respective mechanisms, and to make counterpressure to hold the cells firmly in place during the capping and the washer inserting.

Another object is the provision of new and improved means for positioning the caps in relation to the cells, and for centering the rods with respect to the caps, prior to the placing of the cap on the rod.

Another object is the provision of means for feeding washers in succession into the proper relation with respect to the cells, and for centering the cells and washers prior to the insertion of the washers in the cell.

With these and other objects in view the invention consists in the construction and novel combination of parts fully described hereinafter, illustrated in the accompanying drawings, and pointed out in the claims appended hereto, it being understood that various changes in the form, proportion, size and minor details of construction within the scope of the claims, may be resorted to without departing from the spirit of the invention.

In the drawings forming a part hereof:—

Fig. 1 is a plan view of the improved machine with parts in section.

Fig. 2 is a front view of the washer applying section.

Figs. 3 and 4 are sections on the lines 3—3 and 4—4 respectively, of Fig. 1.

In the present embodiment of the invention, the mechanism is supported on a supporting structure composed of a plurality of bases, indicated at 1 and 2 respectively connected by elements to be described, although it is apparent that a single base might be provided, if desired. An operating shaft 3 is journaled in bearings 4 on the bases, and the shaft is provided between the bases with a gear wheel 5, by means of which it may be connected with a suitable source of power.

At the opposite end from the shaft 3, each base is provided with a pair of opposed cheek plates 5—5a and 6—6a, respectively. In each cheek plate 5 and 6, a shaft is journaled, the shafts being indicated at 7 and 8 respectively, and a similar turret 9 and 10 is mounted on each shaft, between the cheek plates. Each turret has seats 11 for the battery cells indicated at 12, each seat being adapted to receive one cell, and the cells move to and from the turrets on runs 13.

Each of the runs as shown, includes a pair of rails 14 upon which the cells roll, and limiting side walls 15, for limiting endwise movement of the cells, and the runs are inclined as shown, being arranged in sections between and on the outer sides of the turrets, so that the cells will move by gravity from the inlet end of the run to the point of discharge.

Referring to Fig. 2, it will be seen that the ends of the limiting plates 15 are extended in arched formation along the sides of the turret, to near the top thereof, the extensions being indicated at 16, so that the cells in the turrets are guarded at their ends except when immediately above the axis of the turret. When supported by the first turret, the caps indicated at 17 are applied. The caps are applied from a feeding mechanism which may be of the character shown and described in my copending application Serial No. 165,746, filed February 3, 1927. This mechanism includes a chute 18, which has an internal cross section substantially equal to the diametrical cross section of a cap.

The lower end of the chute extends into a recess 19 in the front end of a locater 20, which is mounted to slide in the cheek plate 5 toward and from the turret, and in coaxial alinement with that seat of the turret which is directly above the axis of rotation. The locater 20 is axially counterbored, and a plunger is mounted to move in the counterbore. Referring to Fig. 3, it will be seen that the plunger 21 has a reduced end 22 adjacent the turret, and that the counterbore is similarly reduced. This reduced portion of the counterbore is of a size to receive a single cap as shown, and the reduced portion of the plunger is adapted to discharge a cap from the sleeve and into position on the end of the carbon 23 of the cell 12, which is in position to receive said cap, having been centered by the locater. The adjacent end of the counterbore is flaring or funnel shaped, as shown at 24, to center the carbon, and to facilitate the exit of the cell from the counterbore.

An abutment plate 25 is arranged in a position to register with the cell, when it is above the axis of rotation of the turret, and this plate is carried by a stem 26, held in the cheek plate 5ª. As shown in Figs. 1 and 3, the turret hub has a marginal flange 27 at the end adjacent the cheek plate 5ª, and the abutment plate 25 depends into the annular space between this flange and the adjacent end of the hub. A pin 28 extends laterally from the cheek plate toward the flange, and the flange acts as an abutment to limit the forward movement of the cheek plate under the push of the cell.

Counter pressure mechanism is provided for holding that cell which is above the axis of the turret in the seat. This mechanism, as shown, includes a stirrup 29, the arms of which are pivoted to the sides of the runway at 30. A curved arm 31 extends from the body of the stirrup over the turret, and normally rests upon that cell which is above the axis of the turret. The arm is yieldingly pressed toward the turret by means of a coil spring 32. A stop arm 33 is connected with one of the arms of the stirrup, and extends downwardly toward the base, being adapted to engage the base to limit the movement of the arm 31 toward the turret axis. The spring 32 is arranged between this arm and the base, and normally acts to draw the arm downward, the downward movement, however, being limited by the element 33.

When by means of the turret a cell is brought into the position of Fig. 3, the sleeve or locater 20 is moved toward the cell, and the end of the carbon enters the flaring end of the counterbore. In synchronism therewith, the plunger 21 is moved forwardly, pushing the cap at the lower end of the chute forwardly and onto the end of the carbon which at this time is in the flaring part 24 of the counterbore. The superincumbent caps rest upon the reduced portion of the plunger until the plunger is withdrawn to enable the exit of another cap. Afterwards the sleeve 20 and the plunger 21 are withdrawn, and the cell passes on to the mechanism for inserting a washer.

This mechanism includes a magazine 35, in which the washers 36 are arranged in superposed relation. The front of the magazine is open, and a follower 37 is arranged therein above the stack of washers. The magazine is supported on the cheek plate 6, and the washers are fed in succession from the bottom of the magazine by a pusher 38 operated in a manner to be presently described, and movable through the bottom of the magazine. The cheek plate is cut away in front of the pusher, to provide a recess having an inclined inner wall 39, and a cover plate 40 is arranged over the recess. The ejected washers fall upon this inclined wall, and move down into a vertical slot 42 in the cheek plate.

This slot communicates with a cylindrical opening 43 extending transversely of the cheek plate, and having the end thereof adjacent the turret enlarged or conical in which is mounted to reciprocate a sleeve 44. The sleeve has a slot 45, which is adapted to register with the slot 42, when the parts are in a predetermined position with respect to each other, to enable the passage of a washer from the recess into the sleeve. The sleeve is a locater for the washer, the sleeve being designed to receive the washer, to support it in front of the plunger.

A plunger 46 is arranged within the sleeve, and a head 47 is provided in the front end of the plunger. This head has a tubular extension 48 fitting in an axial recess in the plunger 46, and an ejector 49 is arranged in the head of the extension, the ejector having a head in its inner end, which bears against the inner end of the tubular extension, to limit the outward movement of the ejector, under the influence of a spring 50, which is seated between the ejector and the bottom of the recess, and normally holds it in position shown. The parts are so proportioned that the forward end of the ejector is normally flush with the forward face of the head.

When the parts are in the position of Fig. 4, a washer 36 can pass into the locater in front of the head. When the locater and the plunger are moved toward a cell on the turret, the locater first engages the end of the cell, and centers the cell. Referring to Fig. 4, it will be seen that the forward end of the locater is counterbored or reamed as shown at 51, to receive the cell end and to center the same. When this occurs, the carbon 32 of the cell is in alinement with the ejector 49, and the carbon engages the ejector and moves it inwardly against the resistance of the spring, thus preventing any injury to the carbon from undue pressure.

When the locater and plunger are withdrawn, the ejector under the influence of the spring prevents dragging of the cell with the locater and plunger in their movement of withdrawal. A counter pressure plate indicated generally at 41 is provided in connection with the turret 9, of precisely the same construction and mounted in the same manner as the counter plate 25.

As the plunger 46 and the head 47 move forwardly, the washer is carried therewith, and it is fitted into the end of the cell, and over the cap 10 of the carbon. After the plunger and sleeve have been withdrawn, the turret delivers the capped and washered cell to the runway, by means of which it is discharged from the machine. The turrets are rotated from the shaft 3, by means of countershafts 52, extending forwardly from the shaft 3, and connected thereto by the worm and gear connection indicated at 53. Each shaft is journaled at its forward end in the cheek plate 5 or 6 as the case may be and a disk 54 is secured to each shaft adjacent to the cheek plate.

Each of the disks has a crank pin 55, which is adapted once during each complete rotation of the shaft 52, to engage a spur gear 56 on the shaft 7 or 8, as the case may be, of the adjacent turret. Thus, for each complete rotation of a shaft 52, the turret is moved one step, that is, a quarter turn, the relative arrangement of the elements 54 and 56 being such as to bring about this movement.

The plungers 20 and 21 are reciprocated from the shaft 3. Cams 58 and 59 are mounted on the shaft, and each cooperates with a follower 60 and 61 respectively, connected to the respective plungers 20 and 21, by links 62 and 63. Referring to Fig. 1, it will be seen that the link 62 is yieldingly connected with the follower 60. The link passes through an opening in the follower, and is engaged by nuts 64 and 65 on opposite sides of the follower. A spring 66 encircles the ring between the follower and the nuts 65, which may be adjusted to tension the spring.

When the follower moves forwardly, that is to the left of Fig. 1, the plunger 20 after engaging the cell and pressing it against the abutment 25, may yield to prevent injury to the cell. Similar mechanism is provided for reciprocating the sleeve 44 and the plunger 46. This mechanism includes cams 67 and 68 on the shaft 3, followers 69 and 70, and links 71 and 72 connecting the respective followers with the sleeve and the plunger respectively. The sleeve may yield, a spring 74 being arranged between the ring and the follower, in the same manner as the spring 66 is arranged, and the ring 72 is adjustably connected with both plunger and follower.

The pusher 38 is operated by the follower 70, being connected thereto by means of a link 75 pivoted at one end to the pusher, as shown at 76, and at the other end to the follower. The link 63 connecting the plunger 21 with the follower is adjustable with respect to the plunger, a sleeve nut 63ª being provided, into which the adjacent ends of the link and the plunger are threaded. The link 63 also has threaded engagement with the follower.

The cams 58 and 59 are synchronized to operate the plungers 20 and 21 in sequence, the plunger 20 first advancing and being at once followed by the plunger 21. The movements of the sleeve or locater 44 and the plunger 46 are similarly synchronized. Any suitable source of power may be provided for driving the shaft 3. While the parts are arranged as shown to simultaneously place a cap on one cell and a washer on another, it is apparent that they might be arranged to operate alternately or separately.

It will be apparent from the description that the washer magazine is a tube. The element 45 is a washer chute, and the slide 38 advances the washer from the chute so that it drops into vertical position in the chute. The locater is a means for alining a cell and for receiving the washer, and the plunger is a means for applying the washer to a cell after it has been alined.

What is claimed as new is:—

1. In a machine of the class described, intermittently rotatable means for advancing a cell, means operated during the rest period of said advancing means for capping the cell, and means for afterwards applying a washer to the cell.

2. In a machine of the class described, mechanism to cap a cell, mechanism to apply a washer to a cell, intermittently operating means in connection with each mechanism for advancing a cell to position to be operated upon, and means for making counterpressure in opposition to said mechanism.

3. In a machine of the class described, mechanism to cap a cell, mechanism to apply a washer to a cell, intermittently operating means in connection with each mechanism for advancing a cell to position to be operated upon, said advancing means having open seats for the cells, and yielding means for holding each cell in its seat when in operating position with relation to said mechanisms.

4. In a machine of the class described, intermittently rotatable means for advancing a cell, means operated during the rest period of said advancing means for capping the cell, and means for afterwards applying a washer to the cell, the capping mechanism including means for receiving the cap and holding it in capping position, said means including also mechanism to engage the carbon of the cell to center the same with relation to the cap, and other means movable with relation to said first named means for advancing and placing the cap.

5. In a machine of the class described, intermittently rotatable means for advancing a cell, means operated during the rest period of said advancing means for capping the cell, and means for afterwards applying a washer to the cell, the washer applying mechanism including a substantially tubular member for receiving the washer and for holding said washer diametrically thereof, said means including also means to engage and center the cell with relation to the held washer, and other means movable with relation to said first named means to insert the washer in the cell.

6. In a machine of the character described, cap positioning means, washer positioning means, means for advancing a pair of cells respectively into cap applying and washer inserting positions, means for capping one of said cells, and means arranged in juxtaposition to said capping means for inserting a washer in the other of said cells.

7. In a machine of the character described, a supporting structure, cap applying means slidably mounted in said structure for applying a cap to one cell, and washer inserting means slidably mounted in said structure adjacent to said cap applying means for inserting a washer into another cell.

8. In a machine of the character described, means for inserting a washer into a cell comprising a hollow locater having an opening at one end thereof for receiving a washer in vertical position and for aligning a cell by the engagement of the enlarged portion of said opening with the outer surface of said cell, and a plunger slidable in said locater for advancing said washer relatively to the locater while it is in engagement with said cell.

9. In a machine of the character described, means for feeding a cap into cap applying position including a chute and an open tap locater into which the end of said chute enters, whereby the movement of the cap is controlled during its entry into said locater, there being a passage in said locater for permitting a cap to drop therethrough, a movable rod arranged immediately behind the rear edge of said passage at the time when a cap drops through said passage, means for reciprocating said rod and means for advancing a cell from the cap-applying position to the washer-applying position.

10. In a machine of the character described, cap feeding means, cap applying means adapted to receive a cap from feeding means and to control the movement of said cap during feeding thereof, means adapted to receive cells to be capped and to advance said cells into cap applying position, an inclined washer chute, a washer slide for advancing a washer into said chute whereby said washer is turned at right angles, an open top outer sleeve for receiving said washer and for aligning a cell in the washer applying position and an inner sleeve slidable in said outer sleeve for applying the washer.

11. In a machine of the character described, a cell chute, rotatable means adjacent said chute for receiving a cell from said chute and advancing said cell to capping and washer applying positions, and a curved spring adapted to engage a cell in said means for preventing displacement of said cell.

Signed at New York city, in the county of New York and State of New York, this 8th day of March, A. D. 1928.

ALFRED SCHMIDT.